(12) United States Patent
Avula et al.

(10) Patent No.: US 8,446,058 B2
(45) Date of Patent: May 21, 2013

(54) ELECTRIC MOTOR TERMINAL BLOCK ASSEMBLY

(75) Inventors: Bhaskar Avula, Andhra Pradesh (IN); Sanjay Dyavaiah Patil, Karnataka (IN); Deepak Sarvade, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 319 days.

(21) Appl. No.: 12/886,071

(22) Filed: Sep. 20, 2010

(65) Prior Publication Data

US 2012/0068563 A1    Mar. 22, 2012

(51) Int. Cl.
*H02K 11/00* (2006.01)

(52) U.S. Cl.
USPC .............................................. 310/71; 310/89

(58) Field of Classification Search
USPC ................................ 310/71, 89; 439/709, 810
See application file for complete search history.

(56) References Cited

U.S. PATENT DOCUMENTS

| | | |
|---|---|---|
| 311,378 A | 1/1885 | Saunders |
| 323,813 A | 8/1885 | Kimball |
| 2,403,642 A | 7/1946 | Draxler |
| 2,552,025 A | 5/1951 | Blair |
| 3,585,427 A | 6/1971 | Paule |
| 3,601,760 A | 8/1971 | Cairns |
| 3,626,253 A | 12/1971 | Sturdivan |
| 3,644,066 A | 2/1972 | Heob et al. |
| 3,786,208 A | 1/1974 | Edwards |
| 3,900,769 A | 8/1975 | Russo, Jr. |
| 4,029,372 A | 6/1977 | Clark |
| 4,034,173 A | 7/1977 | Crow et al. |
| 4,071,793 A | 1/1978 | Cox |
| 4,090,230 A | 5/1978 | Fuller et al. |
| 4,097,109 A | 6/1978 | Cross |
| 4,214,801 A | 7/1980 | Cairns et al. |
| 4,221,455 A | 9/1980 | Cairns et al. |
| 4,221,456 A | 9/1980 | Cairns et al. |
| 4,226,493 A | 10/1980 | Cairns et al. |
| 4,227,761 A | 10/1980 | Cairns et al. |
| 4,238,140 A | 12/1980 | Cairns et al. |
| 4,250,420 A | 2/1981 | Grah et al. |
| 4,329,757 A | 5/1982 | Ramstrom et al. |
| 4,390,219 A | 6/1983 | Beehler |
| 4,418,271 A | 11/1983 | Smock |
| 4,418,975 A | 12/1983 | O'Keefe, II |
| 4,476,407 A | 10/1984 | Hildebrandt et al. |
| 4,541,036 A | 9/1985 | Landries et al. |
| 4,585,964 A | 4/1986 | Hildebrandt |
| 4,602,178 A | 7/1986 | Larsson |
| 4,628,236 A * | 12/1986 | Schaefer ....................... 318/558 |
| 4,636,669 A | 1/1987 | Plunkett et al. |
| 4,684,202 A | 8/1987 | House et al. |
| 4,748,531 A | 5/1988 | Ortiz |

(Continued)

*Primary Examiner* — Tran Nguyen
*Assistant Examiner* — Naishadh Desai
(74) *Attorney, Agent, or Firm* — Cantor Colburn LLP

(57) ABSTRACT

An electric motor includes a housing, and a stator arranged within the housing. The stator includes a plurality of terminal leads. A terminal box is mounted to the housing, and a terminal block assembly arranged within the terminal box. The terminal block assembly includes a terminal block portion having a first plurality of terminals and a terminal block section that is distinct from the terminal block portion. The terminal block section including a second plurality of terminals. The terminal block portion is configured and disposed to be spaced from the terminal block section in the terminal box. The plurality of terminal leads is electrically connected to corresponding ones of the first and second pluralities of terminals.

7 Claims, 4 Drawing Sheets

U.S. PATENT DOCUMENTS

| | | | | |
|---|---|---|---|---|
| 4,754,179 | A | 6/1988 | Capuano et al. | |
| 4,781,610 | A * | 11/1988 | Mercer | 439/217 |
| 4,789,224 | A | 12/1988 | Bougsty | |
| 4,851,725 | A | 7/1989 | Keck | |
| 4,880,391 | A * | 11/1989 | Hurtgen | 439/221 |
| 4,940,423 | A | 7/1990 | Aihara et al. | |
| 5,015,894 | A | 5/1991 | Crow et al. | |
| 5,023,498 | A | 6/1991 | Abe | |
| 5,063,314 | A | 11/1991 | DeSantis | |
| 5,097,168 | A | 3/1992 | Takekoshi et al. | |
| 5,113,101 | A | 5/1992 | Liu et al. | |
| 5,115,701 | A | 5/1992 | Lehnert | |
| 5,195,913 | A | 3/1993 | Shattuck | |
| 5,381,501 | A | 1/1995 | Cardinal et al. | |
| 5,408,154 | A * | 4/1995 | Meiser et al. | 310/71 |
| 5,456,348 | A | 10/1995 | Whetsel et al. | |
| 5,483,212 | A | 1/1996 | Lankuttis et al. | |
| 5,483,213 | A | 1/1996 | Mueller et al. | |
| 5,606,299 | A | 2/1997 | Innes et al. | |
| 5,794,325 | A | 8/1998 | Fallandy | |
| 5,822,168 | A | 10/1998 | Boudet et al. | |
| 5,861,689 | A | 1/1999 | Snider et al. | |
| 5,907,244 | A | 5/1999 | Crabill et al. | |
| 5,989,085 | A | 11/1999 | Suzuki | |
| 6,048,219 | A | 4/2000 | Kotowski | |
| 6,059,613 | A | 5/2000 | Feher et al. | |
| 6,149,471 | A | 11/2000 | Kemp et al. | |
| 6,220,901 | B1 * | 4/2001 | Fisher et al. | 439/709 |
| 6,271,608 | B1 * | 8/2001 | Haydock et al. | 310/71 |
| 6,300,698 | B1 | 10/2001 | Fargo et al. | |
| 6,309,253 | B1 | 10/2001 | Tsai | |
| 6,318,360 | B1 | 11/2001 | Attolini | |
| 6,375,439 | B1 | 4/2002 | Missio | |
| 6,388,894 | B1 | 5/2002 | Paggi et al. | |
| 6,455,962 | B2 | 9/2002 | Suzuki et al. | |
| 6,545,860 | B1 | 4/2003 | Pierce | |
| 6,608,414 | B1 * | 8/2003 | Conley | 310/89 |
| 6,686,712 | B2 | 2/2004 | Numaguchi et al. | |
| 6,824,432 | B2 * | 11/2004 | Katsuzawa et al. | 439/709 |
| 6,842,352 | B2 | 1/2005 | Naito et al. | |
| 6,856,056 | B2 * | 2/2005 | Lyle et al. | 310/71 |
| 6,879,070 | B2 | 4/2005 | Leany et al. | |
| 6,909,208 | B2 | 6/2005 | Suzuki et al. | |
| 6,916,213 | B2 * | 7/2005 | Nyblin et al. | 439/709 |
| 6,984,635 | B1 | 1/2006 | Schreiber et al. | |
| 7,082,141 | B2 | 7/2006 | Sharma et al. | |
| 7,092,406 | B2 | 8/2006 | Sharma et al. | |
| 7,134,993 | B2 | 11/2006 | Lia et al. | |
| 7,181,923 | B2 | 2/2007 | Kurita et al. | |
| 7,348,696 | B2 | 3/2008 | Sonohara et al. | |
| 7,442,095 | B2 | 10/2008 | Sonohara | |
| 7,445,529 | B2 | 11/2008 | Takizawa et al. | |
| 7,542,555 | B2 | 6/2009 | Caswell et al. | |
| 7,615,975 | B2 | 11/2009 | Tsukashima et al. | |
| 2011/0266900 | A1 * | 11/2011 | Gaumer et al. | 310/71 |

* cited by examiner

ELECTRIC MOTOR TERMINAL BLOCK ASSEMBLY

BACKGROUND OF THE INVENTION

The subject matter disclosed herein relates to rotating electric machine and, more particularly, to a terminal block assembly for an electric motor.

Conventional electric motors manufactured to International Electrotechnical Commission (IEC) standards employ a terminal block to connect motor leads to available power leads. The terminal block is mounted in a housing attached to the motor. Once mounted, motor leads are attached to a first set of terminals on the terminal block and conductors that provide power are attached to a second set of terminals on the terminal block. Often times, the first and second sets of terminals are connected to establish a desired connection, such as wye or delta, for the electric motor.

BRIEF DESCRIPTION OF THE INVENTION

According to one aspect of the invention, an electric motor includes a housing, and a stator arranged within the housing. The stator includes a plurality of terminal leads. A terminal box is mounted to the housing, and a terminal block assembly arranged within the terminal box. The terminal block assembly includes a terminal block portion having a first plurality of terminals and a terminal block section that is distinct from the terminal block portion. The terminal block section includes a second plurality of terminals. The terminal block portion is configured and disposed to be spaced from the terminal block section in the terminal box. The plurality of terminal leads is electrically connected to corresponding ones of the first and second pluralities of terminals.

According to another aspect of the invention, an electric motor terminal block assembly includes a terminal block portion having a first plurality of terminals, and a terminal block section that is distinct from the terminal block portion. The terminal block section includes a second plurality of terminals. The terminal block portion is configured and disposed to be spaced from the terminal block section in a terminal box.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
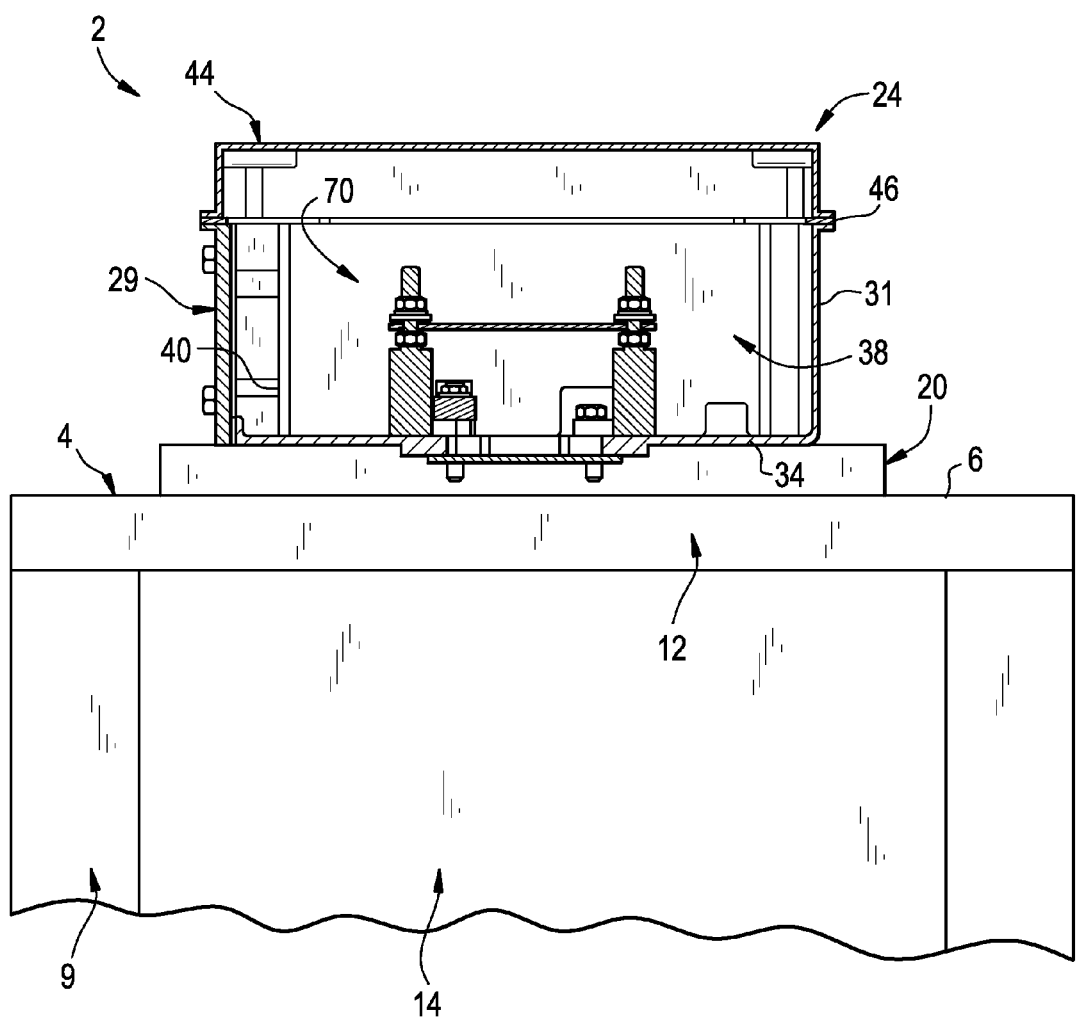
FIG. 1 is a partial cross-sectional view of an electric motor including a terminal block assembly arranged in a terminal box in accordance with an exemplary embodiment.
Figure 2:
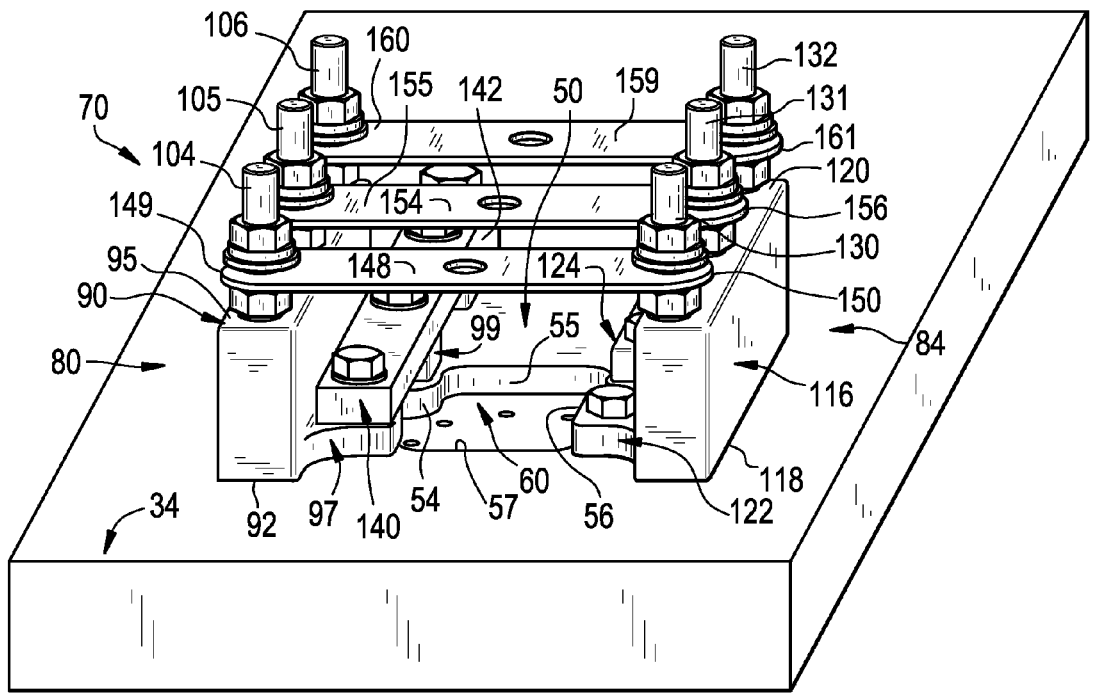
FIG. 2 is a lower right perspective view of the terminal block assembly of FIG. 1 shown arranged in a delta wiring configuration.
Figure 3:
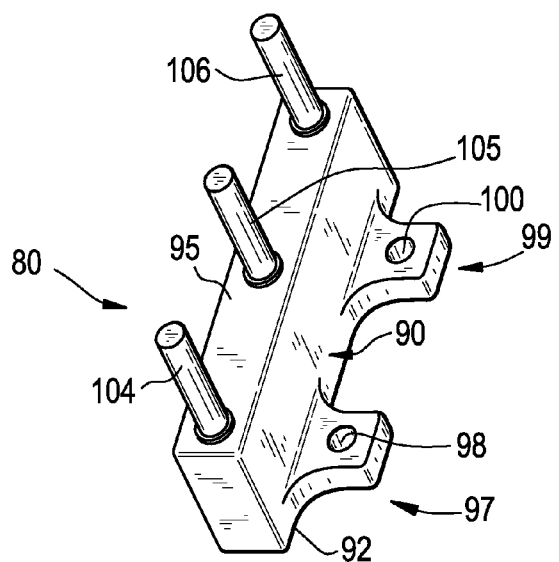
FIG. 3 is a lower right perspective view of a terminal block portion of the terminal block assembly of FIG. 2.

With reference to FIGS. 1-3, an electric motor constructed in accordance with an exemplary embodiment is indicated generally at 2. Electric motor 2 includes a housing 4 having an external surface 6 and an interior portion 9. A stator 12 and a rotor 14 are arranged within interior portion 9. Electric motor 2 is also shown to include a terminal box support member 20 provided on external surface 6 of housing 4. A terminal box 24 is provided upon terminal box support surface 20.

Figure 4:
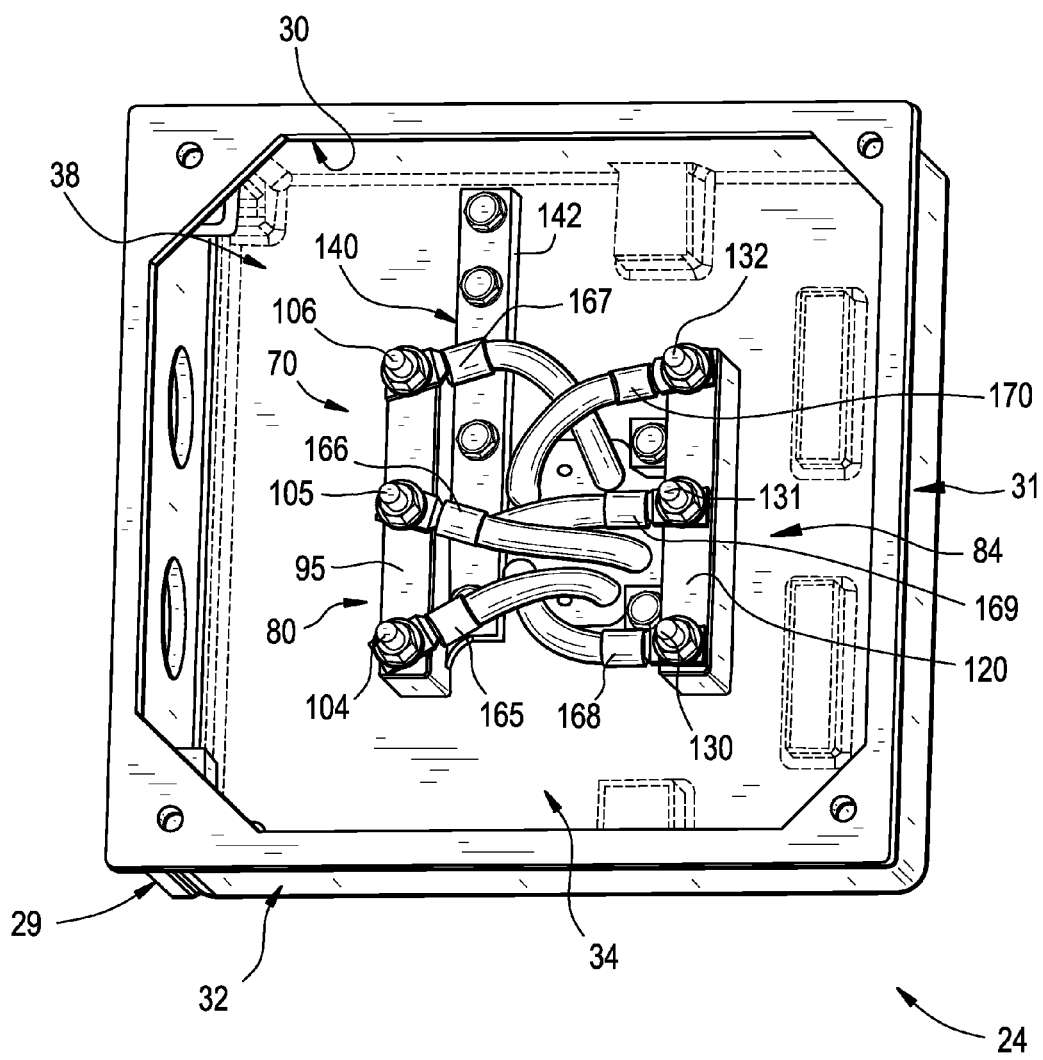
FIG. 4 is an upper perspective view of the terminal block assembly connected to motor terminal leads and mounted in the terminal box of FIG. 1.

Terminal box 24 includes a first side wall 29, a second side wall 30 (FIG. 4), a third side wall 31 and a fourth side wall 32 that together with a base wall 34 define an interior section 38. In the exemplary embodiment shown, first side wall 29 takes the form of a gland plate 40 that provides an interface for external connections. Terminal box 24 is also shown to include a cover 44 that is secured to side walls 29-32 through a gasket 46. Base wall 34 includes a terminal passage 50 that allows terminals to pass from stator 12 into terminal box 24. Terminal passage 50 includes a first side portion 54, a second side portion 55, a third side portion 56 and a fourth side portion 57 that collectively define an opening 60. Opening 60 includes rounded corners (not separately labeled) that are provided to protect lead wires from damage.

Electric motor 2 includes a terminal board or block assembly 70 arranged in terminal box 24 at terminal passage 50. Terminal block assembly 70 includes a terminal block portion 80 positioned along first side portion 54 and a terminal block section 84 that spaced from terminal block portion 80 across opening 60 and extends along third side portion 56. Terminal block portion 80 includes a body portion 90 having a base portion 92 and a terminal surface portion 95. Base portion 92 includes a first mounting member 97 having an opening 98 and a second mounting member 99 having an opening 100. Each opening 98, 100 is configured to receive a mechanical fastener (not separately labeled) that joins terminal block portion 80 to base wall 34 and terminal box support member 20. Terminal block portion 80 is further shown to include a plurality of terminals 104-106 that extend from terminal surface portion 95. Similarly, terminal block section 84 includes a body section 116

Figure 5:
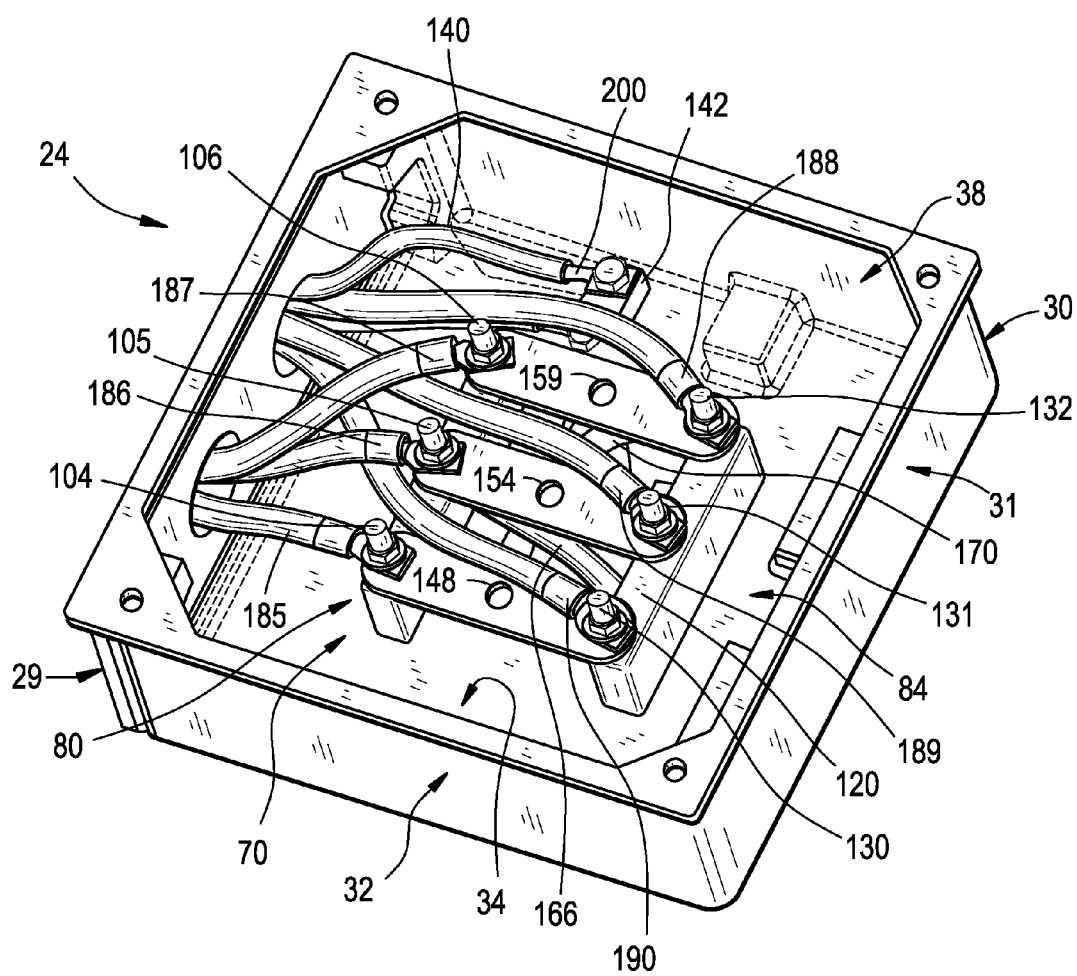
FIG. 5 is an upper perspective view of the terminal block assembly in the terminal box of FIG. 1 arranged in the delta configuration and shown connected to terminal leads and to external power source leads.

Terminal block assembly 70 is also shown to include a grounding bar 140 that is secured to terminal block portion 80 at first and second mounting members 97 and 99. Grounding bar 140 includes a mounting support 142 that is mounted to base wall 34 and terminal box support member 20. In the exemplary embodiment shown, terminal block assembly 70 includes a first linking member 148. First linking member 148 includes a first end 149 that is mounted to terminal 104 and a second end 150 that is mounted to terminal 130. Terminal block assembly 70 also includes a second linking member 154 having a first end 155 that is mounted to terminal 105 and a second end 156 that is mounted to terminal 131, and a third linking member 159 having a first end 160 that is mounted to terminal 106 and a second end 161 that is mounted to terminal 132. Linking members 148, 154, and 159 establish a desired electrical connection configuration for stator 12. More specifically, stator 12 includes a plurality of terminals 165-170 (FIG. 4) that extend through terminal passage 50 and electrically connect with corresponding ones of terminals 104-106 and 130-132. Once in place, linking members 148, 154, and 159 are connected to establish, for example a delta configuration. At this point, power leads 185-187, 188-190, and a ground lead 200 are mounted to terminals 104-106, 130-132, and grounding bar 140 respectively such as shown in FIG. 5.

At this point it should be understood that the exemplary embodiment provides a multi-piece terminal block assembly for electric motors. Of course, the exemplary embodiments could also be employed in connection with various other electrical machines. By forming the terminal block assembly in multiple components, technicians will have little difficulty making any necessary wiring connections. More over, the use of multiple components provides flexibility in mounting the terminal block assembly so as to accommodate various size conductors without requiring difficult bends, wire cramping and the like that may lead to damage to insulation or loose connections.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electric motor comprising:
    a housing;
    a stator arranged within the housing, the stator including a plurality of terminal leads;
    a terminal box mounted to the housing; and
    a terminal block assembly arranged within the terminal box, the terminal block assembly including a terminal block portion including a body portion having a base portion including at least one mounting member secured in the terminal box through a first mechanical fastener and a terminal surface portion supporting a first plurality of terminals and a terminal block section that is distinct from the terminal block portion, the terminal block section including a body section having a base section including at least one mounting element secured in the terminal box through a second mechanical fastener and a terminal surface section supporting a second plurality of terminals, the terminal block portion being configured and disposed to be spaced from the terminal block section in the terminal box, the plurality of terminal leads being electrically connected to corresponding ones of the first and second pluralities of terminals.

2. The electric motor according to claim 1, further comprising: a grounding bar secured to one of the at least one mounting member and the at least one mounting element, the grounding bar being electrically connected to the housing.

3. The electric motor according to claim 1, further comprising: a plurality of linking members electrically connecting select ones of the first plurality of terminals and the second plurality of terminals, the plurality of linking members establishing a desired electrical configuration for the plurality of terminal leads.

4. The electric motor according to claim 1, further comprising: a terminal passage formed in the terminal box, the terminal passage including a first side portion, a second side portion, a third side portion, and a fourth side portion that collectively define an opening leading into the housing, the terminal block portion being arranged along the first side portion and the terminal block section being arranged on the third side portion opposite the terminal block portion.

5. An electric motor terminal block assembly comprising:
    a terminal block portion including a body having a base portion having at least one mounting member including at least one opening configured to receive a first mechanical fastener and a terminal surface portion, the terminal surface portion supporting a first plurality of terminals; and
    a terminal block section that is distinct from the terminal block portion, the terminal block section including a base section including at least one mounting element having an least one opening configured to receive a second mechanical fastener and a terminal surface section, the terminal surface section supporting a second plurality of terminals, the terminal block portion being configured and disposed to be spaced from the terminal block section in a terminal box.

6. The electric motor terminal block assembly according to claim 5, further comprising: a grounding bar secured to one of the at least one mounting member and the at least one mounting element.

7. The electric motor according to claim 5, further comprising: a plurality of linking members electrically connecting select ones of the first plurality of terminals and the second plurality of terminals, the plurality of linking members establishing a desired electrical configuration for an electric motor.

* * * * *